March 27, 1928.
E. L. HOLMES
1,663,552
ELECTROLYTIC RHEOSTAT
Filed Jan. 24, 1925
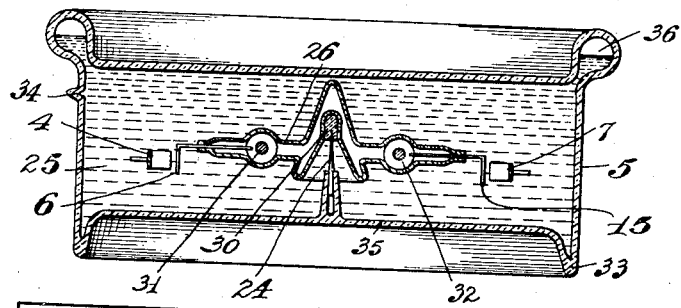
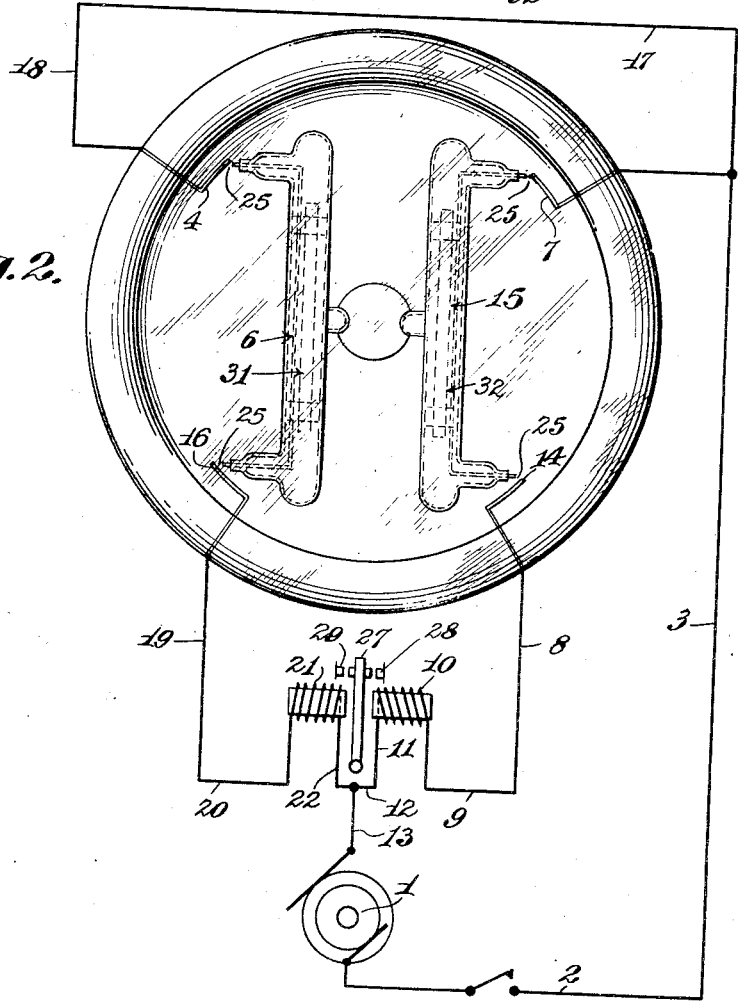
INVENTOR
Edward L. Holmes
BY
Gifford Hull
his ATTORNEYS Patented Mar. 27, 1928.

1,663,552

UNITED STATES PATENT OFFICE.

EDWARD L. HOLMES, OF NEW YORK, N. Y., ASSIGNOR TO HOLMES NAVIGATING APPARATUS CO., INC., OF NEW YORK, N. Y., A CORPORATION OF NEW YORK.

ELECTROLYTIC RHEOSTAT.

Application filed January 24, 1925. Serial No. 4,619.

The following is a description of an electrolytic control system embodying my invention in the form and manner at present preferred by me; but it will be understood that various modifications and changes may be made without departing from the spirit of my invention and without exceeding the scope of my claims.

My invention will best be understood by reference to the accompanying drawings, in which Fig. 1 shows in vertical section an electrolytic cell and various elements associated therewith; and Fig. 2 shows schematically the several units of the system, together with a wiring diagram of electric circuits which may be employed in connection therewith. Like reference characters indicate like parts throughout the drawings.

Referring to the drawings, 5 represents a bowl or other container (preferably formed of glass), carrying an electrolyte 25, in which may be rotatably mounted as upon a pivot 24, bearing in a jewel 30, a support 26, formed of insulating material, such as glass, and carrying pivotal conductors 6 and 15 and magnetically-responsive elements 31 and 32. Mounted in the periphery of container 5 are four stationary conductors 4, 7, 14 and 16. Alternating current from one terminal of a source 1 flows through lines 2 and 3, stationary conductor 7, electrolyte 25, pivotal conductor 15, electrolyte 25, stationary conductor 14, lines 8 and 9, relay coil 10 and lines 11, 12 and 13 to the opposite terminal of source 1. Alternating current also flows from the first-mentioned terminal of source 1, through lines 2, 3, 17 and 18, through stationary conductor 4, electrolyte 25, pivotal conductor 6, electrolyte 25, stationary conductor 16, lines 19 and 20, through relay coil 21 and lines 22, 12 and 13 to the opposite terminal of source 1.

Pivotal conductors 6 and 15 are preferably formed of platinum wires, both ends of each of said conductors preferably projecting downwardly. Stationary conductors 4, 7, 14 and 16 are preferably made of strips of platinum. This arrangement renders the resistance of the electrolytic paths very susceptible to slight displacements between such stationary and pivotal conductors. In order to localize these electrolytic paths between the stationary conductors and the pivotal conductors and thereby render the device more sensitive, I preferably insulate substantially all of the surfaces of the pivotal conductors except the downwardly-projecting portions, by enclosing same in vitreous material (such as glass) which is fused thereto.

With the stationary and pivotal conductors in normal operative relationship, and so long as there is no rotative movement between support 26 and container 5, the energization of relay coils 10 and 21 is substantially equal, and relay armature 27 remains in a neutral position in which it does not close a secondary circuit. However, upon a slight rotative displacement between said members, due, for example, to the turning of support 26 in a clockwise direction, as by magnetic lines of force acting upon elements 31 and 32, the electrolytic paths between stationary conductors 4 and 16 and pivotal conductor 6 are lengthened, thereby increasing the resistance of the circuit which includes said pivotal conductor 6 and relay coil 21. Due to the form of the pivotal and the stationary conductors, respectively, and to their operative relationship, the clockwise movement of support 26 has produced substantially no change in the length of the electrolytic paths between stationary conductors 7 and 14 and pivotal conductor 15. Consequently, the resistance of the circuit which includes pivotal conductor 15 and relay coil 10 remains substantially constant. Thus the energization of relay coil 10 is greater than that of relay coil 21, and relay armature 27 is attracted to close a secondary circuit which includes contact member 28. It will be apparent that a counter-clockwise movement of support 26 will produce the opposite effect, causing the relay to close the secondary circuit which includes contact member 29. I thus utilize the differential between the resistances of the two electrolytic circuits for actuating external devices which may be caused to faithfully reproduce movements between the stationary and the pivotal conductors. My invention affords accurate means for reproducing very slight movements relative to a sensitive element, such as the directional element of a primary compass (which may be substituted for magnetically-responsive elements 31 and 32), wherein the force exerted is insufficient to close electric circuits by metallic contact without interfering with the freedom of movement of such sensitive element.

I am aware that it has heretofore been proposed to utilize for similar purposes a circuit including an electrolyte, such circuit carrying direct current. These systems are inoperative for precision work for several reasons, among which may be mentioned the fact that if indestructible conductors are employed in an electrolyte carrying direct current, the electrolyte is decomposed, resulting in the evolution of gases which, in the form of bubbles, adhere to the conductors and to the container. These bubbles produce changes in resistance in the electrolytic circuits, and also result in friction and capillary attraction between the moving parts. If direct current be employed, this evolution and deposition of gases occurs with all combinations of electrolytes and conductors except where pure metallic conductors are used in combination with an electrolyte containing a salt of the metal comprising one of the conductors. Under these conditions, gas bubbles do not collect, but a plating action occurs which results in the disintegration of the conductors which constitute the anodes and in the building up of the conductors which constitute the cathodes.

In attempts to utilize movements such as those relative to a magnetic compass needle, for varying the resistance of electrolytic circuits, it has been proposed to convey electric current through a pivotal bearing. Such devices are impracticable for the reason that the pivotal bearing is necessarily of minute area, and, in order to conduct current through it, the pivot and bearing must be metallic. Therefore any slight jarring which tends to momentarily separate the bearing elements causes arcing with consequent fusion which quickly destroys the usefulness of the bearing.

I obviate the disadvantages incident to the use of an electrolytic circuit carrying direct current by employing in my system alternating current which produces no resultant plating action, and which has much less decomposing effect upon the electrolyte than has direct current. In fact, I have found that by employing distilled water acidulated with chemically-pure hydrochloric acid to a point where the minimum resistance of the electrolytic circuit is from 1,000 to 2,000 ohms, in combination with alternating current of a frequency of sixty cycles per second, and with a current density in platinum conductors of about .75 of an ampere per square inch, there occurs no release of gases as a result of decomposition of the electrolyte. When an electrolytic system is employed in connection with a navigating compass, it is highly desirable that the electrolyte shall not be subject to freezing at ordinary temperatures. Under these circumstances, I render my electrolyte non-freezing by adding to the water of the electrolyte an equal quantity of chemically-pure methyl alcohol. I have found that this non-freezing mixture has satisfactory electrolytic properties and does not decompose under the conditions which I have mentioned above.

Where it is sought to employ an electrolytic control system in which conditions are such that decomposition of the electrolyte occurs, the resulting evolution and escape of gases changes the resistance of the electrolyte and thus renders the entire circuit unstable and inapplicable to precision work. My invention possesses the essential feature of resistance stability from the viewpoint of non-decomposition of the electrolyte. By preventing decomposition, I am also enabled to enclose the electrolyte in a hermetically-sealed container, from which air and other gases have been exhausted, which obviously cannot be done with a decomposing electrolyte because of the constant evolution of gases and the bubbles and pressure which result therefrom. The sealing of the container not only prevents evaporation and consequent changes in the electrolyte which would affect its resistance, but also obviates contamination of the electrolyte by foreign matter—which contamination would also produce a change in resistance. The bowl 5 is formed by a circumferential fused seam 33 joining the upper portion of said bowl to bowl bottom 35. With the electrolyte in the bowl, air and other gases are exhausted from said bowl, which is then hermetically sealed by fusing tip 34 in a well-known manner.

With liquid compasses of the enclosed type, it is necessary that the bowl chamber be completely filled in order that oscillation of the bowl may not set up wave motions which disturb the pivotal element; and for the further reason that evaporation of the liquid would otherwise cloud the bowl and obscure vision. With a completely filled bowl, provision must, of course, be made for expansion of the liquid. Various expedients have been resorted to to accomplish this result, among them being the attaching to the lower portion of the compass bowl of a metallic sylphon bellows, the action of which is to maintain the bowl chamber full and at the same time allow for expansion of the liquid. Such a metallic device cannot be employed in conjunction with an electrolyte. I have therefore devised means for meeting all these conditions, which means consist of using a hermetically-sealed bowl having at its upper portion an annular expansion chamber 36, so located as to permit of completely filling the body of the bowl. I leave the upper part of this chamber unfilled in order to permit of expansion of the liquid in the bowl proper. I form between the bowl body and the expansion chamber a constricted annular passage the effect of which is to prevent oscillation of the bowl communicating wave motions to the main body of liquid. Where the bowl is employed in connection with a navigating compass, it is preferably constructed of one piece of transparent insulating material which is insoluble in the electrolyte.

What I claim as new and desire to secure by Letters Patent of the United States is:

1. A rheostat comprising a hermetically sealed bowl, an electrolyte contained in said bowl, an electric circuit including said electrolyte, a partially-insulated movable conductor and a plurality of stationary conductors in contact with said electrolyte.

2. In a rheostat, an electrolyte, a container for said electrolyte, electric circuits including said electrolyte and a plurality of conductors attached to said container and contacting with said electrolyte and a plurality of conductors movable in said container and contacting with said electrolyte, said conductors being so constructed and arranged that displacement between said container conductors and said movable conductors increases the resistance of one of said container circuits only.

3. In a rheostat, an electrolyte, a container for said electrolyte, conductors attached to said container and contacting with said electrolyte, conductors movable in said container and contacting with said electrolyte, an insulating member supporting said movable conductors, a pivotal bearing of non-conducting material for said supporting member and an electric circuit including said electrolyte and said conductors.

4. In a rheostat, two electric circuits connected in parallel, each of said circuits including stationary and movable conductors and a common electrolyte, said conductors being so constructed and arranged that the length of the electrolytic paths of either circuit may be increased while that of the other circuit remains substantially constant.

5. In a rheostat, electric circuits each including a plurality of metallic conductors and an electrolyte common to said circuits, said electrolyte being enclosed in a hermetically-sealed container provided with an expansion chamber.

6. In a rheostat, an electrolyte, a hermetically-sealed container for said electrolyte, electric conductors attached to said container and contacting with said electrolyte, a partially-insulated electric conductor movable in said container and contacting with said electrolyte, and an electric circuit including said electrolyte and conductors, the materials of said rheostat being mutually chemically inert.

7. In a rheostat, an electrolyte, a hermetically-sealed glass container for said electrolyte, and an electric circuit including said electrolyte, a plurality of conductors associated with said container, and a partially-insulated movable conductor.

8. In a rheostat, an electrolyte, a hermetically-sealed container for said electrolyte formed of vitreous material, and an electric circuit including said electrolyte, a plurality of conductors associated with said container and a plurality of partially-insulated movable conductors.

9. In a rheostat, an electrolyte, a container for said electrolyte, electrical conductors attached to said container, a housing of insulating material chemically inert with reference to said electrolyte and movable in said electrolyte, a magnetically-responsive element enclosed in said housing, an electrical conductor partially enclosed in said housing, and an electric circuit including said electrolyte and conductors.

10. In a rheostat, an electrolyte, a hermetically-sealed container for said electrolyte, conductors attached to said container, a housing of insulating material chemically inert with reference to said electrolyte and movable in said container, an electrical conductor partially enclosed in said housing, and an electric circuit including said electrolyte and conductors.

11. In a rheostat, an electrolyte, a container for said electrolyte, conductors attached to said container, a glass float mounted in said container, a magnetically-responsive element carried by said float an electrical conductor associated with said float and an electric circuit including said electrolyte, container conductors and float conductor.

12. In a rheostat, an electrolyte, a hermetically-sealed glass bowl containing said electrolyte, electrical conductors attached to said bowl, a coacting partially-insulated electrical conductor movable in said bowl, and an electric circuit including said electrolyte and conductors.

13. In a rheostat, an electrolyte, a container for said electrolyte, electrical conductors attached to said container, a pivotally-mounted conductor movable in said container and contacting with said electrolyte, a pivotally-mounted hermetically-sealed housing, a magnetically-responsive element contained in said housing, and controlling the position of said pivotally-mounted conductor, and an electric circuit including said conductors and electrolyte and independent of said pivotal bearing.

14. In a rheostat, an electrolyte, a hermetically-sealed container for said electrolyte having an expansion chamber, a constricted communicating passage between the body of said container and said expansion chamber, and electric circuits associated with said container and each including said electrolyte and stationary and movable conductors.

15. In a rheostat, an electrolyte, a container therefor having an expansion chamber and a constricted passage between said expansion chamber and the body of said container, and two electric circuits associated with said container and each including said electrolyte and stationary and movable conductors.

16. In a rheostat, the combination of an electrolyte, a container therefor having an expansion chamber of lesser area than the body of said container, a communicating passage between said expansion chamber and the body of said container and of lesser area than said chamber, and a plurality of electric circuits associated with said container and each including said electrolyte and stationary and movable conductors.

17. In a rheostat, a glass container having a main chamber, an expansion chamber and a constricted communicating passage between said main chamber and said expansion chamber, an electrolyte in said container, and a plurality of electric circuits each including said electrolyte and stationary and movable conductors.

18. In a rheostat, a glass container, an electrolyte therein, a plurality of conductors movable in said electrolyte, a plurality of stationary conductors contacting with said electrolyte and elongated in the plane of movement of said movable conductors and an electric circuit including said electrolyte and conductors.

19. In a rheostat, a container, an electrolyte therein, a plurality of partially-insulated conductors movable in said electrolyte, a plurality of stationary conductors contacting with said electrolyte and elongated in the plane of movement of said movable conductor and electric circuits including said electrolyte and conductors.

20. In a rheostat, a container formed of vitreous material, an electrolyte therein, a plurality of partially-insulated conductors movable in said electrolyte, a plurality of stationary conductors contacting with said electrolyte and elongated in the plane of movement of said movable conductors and a plurality of electric circuits to which said electrolyte is common.

EDWARD L. HOLMES.